United States Patent
Clark et al.

(10) Patent No.: US 11,609,692 B2
(45) Date of Patent: Mar. 21, 2023

(54) CURSOR ADJUSTMENTS

(71) Applicant: Hewlett-Packard Development Company, L.P., Spring, TX (US)

(72) Inventors: Alexander Wayne Clark, Houston, TX (US); Brandon James Lee Haist, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 65 days.

(21) Appl. No.: 16/603,615

(22) PCT Filed: Apr. 7, 2017

(86) PCT No.: PCT/US2017/026645
§ 371 (c)(1),
(2) Date: Oct. 8, 2019

(87) PCT Pub. No.: WO2018/186889
PCT Pub. Date: Oct. 11, 2018

(65) Prior Publication Data
US 2022/0066618 A1   Mar. 3, 2022

(51) Int. Cl.
*G06F 3/04883* (2022.01)
*G06F 3/04812* (2022.01)
(Continued)

(52) U.S. Cl.
CPC ...... *G06F 3/04883* (2013.01); *G06F 3/04812* (2013.01); *G06F 3/04842* (2013.01);
(Continued)

(58) Field of Classification Search
None
See application file for complete search history.

(56) References Cited

U.S. PATENT DOCUMENTS

| | | | | |
|---|---|---|---|---|
| 7,453,439 B1 * | 11/2008 | Kushler | ............. | G06F 3/04883 345/173 |
| 7,706,616 B2 * | 4/2010 | Kristensson | ....... | G06V 30/1423 382/229 |

(Continued)

FOREIGN PATENT DOCUMENTS

| | | |
|---|---|---|
| GB | 2504492 A | 2/2014 |
| KR | 20150025041 | 3/2015 |

OTHER PUBLICATIONS

Magic-sense: Dynamic Cursor Sensitivity-based Magic Pointing, May 5-10, 2012.
(Continued)

*Primary Examiner* — Stella Higgs
(74) *Attorney, Agent, or Firm* — Quarles & Brady LLP

(57) ABSTRACT

Example implementations relate to cursor adjustments. In some examples, a computing device may include a cursor positioning device. The computing device may include a processor to determine a first input associated with a first cursor path received from the cursor positioning device. The computing device may include a processor to determine a modified output of the first cursor path that is different from the first input. The computing device may include a processor to determine a second cursor path based on the modified output. The computing device may include a processor to determine an adjustment based on a difference between the first cursor path and the second cursor path. The computing device may include a processor to apply the adjustment to a third cursor path.

14 Claims, 3 Drawing Sheets

(51) Int. Cl.
*G06F 3/04842* (2022.01)
*G06F 3/04886* (2022.01)
*G06F 40/166* (2020.01)
*G06F 40/232* (2020.01)

(52) U.S. Cl.
CPC ........ *G06F 3/04886* (2013.01); *G06F 40/166* (2020.01); *G06F 40/232* (2020.01)

(56) References Cited

U.S. PATENT DOCUMENTS

| | | | | |
|---|---|---|---|---|
| 8,487,897 B1* | 7/2013 | Hsieh | ............... | G06F 3/04886 345/173 |
| 8,698,746 B1* | 4/2014 | Merrick | ............... | G06F 3/038 345/157 |
| 8,704,765 B1 | 4/2014 | Murphy et al. | | |
| 8,773,377 B2* | 7/2014 | Zhao | ............... | G06F 3/0488 345/173 |
| 8,793,620 B2* | 7/2014 | Stafford | ............... | G06F 3/04842 715/858 |
| 10,048,861 B2* | 8/2018 | Bozzini | ............... | G06F 21/83 |
| 10,082,952 B2* | 9/2018 | Wang | ............... | G06F 16/335 |
| 10,394,442 B2* | 8/2019 | Cudak | ............... | G06F 3/04186 |
| 10,572,066 B2* | 2/2020 | Lim | ............... | G06F 3/0418 |
| 2008/0150909 A1* | 6/2008 | North | ............... | G06F 3/0418 345/173 |
| 2009/0179853 A1 | 7/2009 | Beale | | |
| 2010/0302212 A1* | 12/2010 | Weber | ............... | G06F 3/0488 345/178 |
| 2011/0050618 A1* | 3/2011 | Murphy | ............... | G06F 3/0446 345/174 |
| 2011/0179374 A1* | 7/2011 | Yagi | ............... | G06F 3/0418 715/773 |
| 2012/0036469 A1* | 2/2012 | Suraqui | ............... | G06F 40/274 715/773 |
| 2012/0272179 A1 | 10/2012 | Stafford | | |
| 2012/0313882 A1* | 12/2012 | Aubauer | ............... | G06F 3/046 345/174 |
| 2013/0046544 A1* | 2/2013 | Kay | ............... | G06F 3/023 345/169 |
| 2013/0187895 A1* | 7/2013 | Oljaca | ............... | G06F 3/0416 345/178 |
| 2013/0219417 A1* | 8/2013 | Gilson | ............... | H04N 21/44218 725/12 |
| 2013/0249818 A1* | 9/2013 | Zhai | ............... | G06F 3/04886 345/173 |
| 2013/0290894 A1* | 10/2013 | Aides | ............... | G06F 3/04886 715/773 |
| 2013/0311956 A1* | 11/2013 | Li | ............... | G06F 3/0237 715/863 |
| 2014/0115521 A1* | 4/2014 | Kataoka | ............... | G06F 3/017 715/773 |
| 2014/0115522 A1* | 4/2014 | Kataoka | ............... | G06F 3/04883 715/773 |
| 2015/0277554 A1* | 10/2015 | Rezaee | ............... | G06F 3/14 345/156 |
| 2016/0124926 A1* | 5/2016 | Fallah | ............... | G06F 3/0237 715/271 |
| 2016/0282956 A1* | 9/2016 | Ouyang | ............... | G06F 3/04886 |
| 2016/0299685 A1* | 10/2016 | Zhai | ............... | G06F 3/04886 |
| 2017/0060335 A1* | 3/2017 | Chiang | ............... | G06F 3/0418 |
| 2017/0357372 A1* | 12/2017 | Morimoto | ............... | G06F 3/0446 |
| 2018/0046319 A1* | 2/2018 | Luo | ............... | G06F 3/044 |
| 2018/0247438 A1* | 8/2018 | Asente | ............... | G06T 11/203 |
| 2018/0300014 A1* | 10/2018 | Lim | ............... | G06F 3/04186 |
| 2018/0300056 A1* | 10/2018 | Buxton | ............... | G06F 3/0488 |
| 2018/0348891 A1* | 12/2018 | Kim | ............... | G06F 3/04886 |

OTHER PUBLICATIONS

Rubino, D., Tobii Wants You to Control Your Pc with Just Your Eyes and We Show You How, Jan. 6, 2016, <http://www.windowscentral.com/tobii-wants-you-control-your-pc-just-your-eyes >.

* cited by examiner

CURSOR ADJUSTMENTS

BACKGROUND

A computing device may include a user interface where an interaction between the computing device and a user may occur. For example, a computing device may provide a graphical user interface that allows a user to interact with the computing device operating system and applications through the use of graphical icons and visual indicators. Sensing devices and surfaces may be utilized to translate user touch and user movement into graphical user interface movement and action.

DETAILED DESCRIPTION

Figure 1:
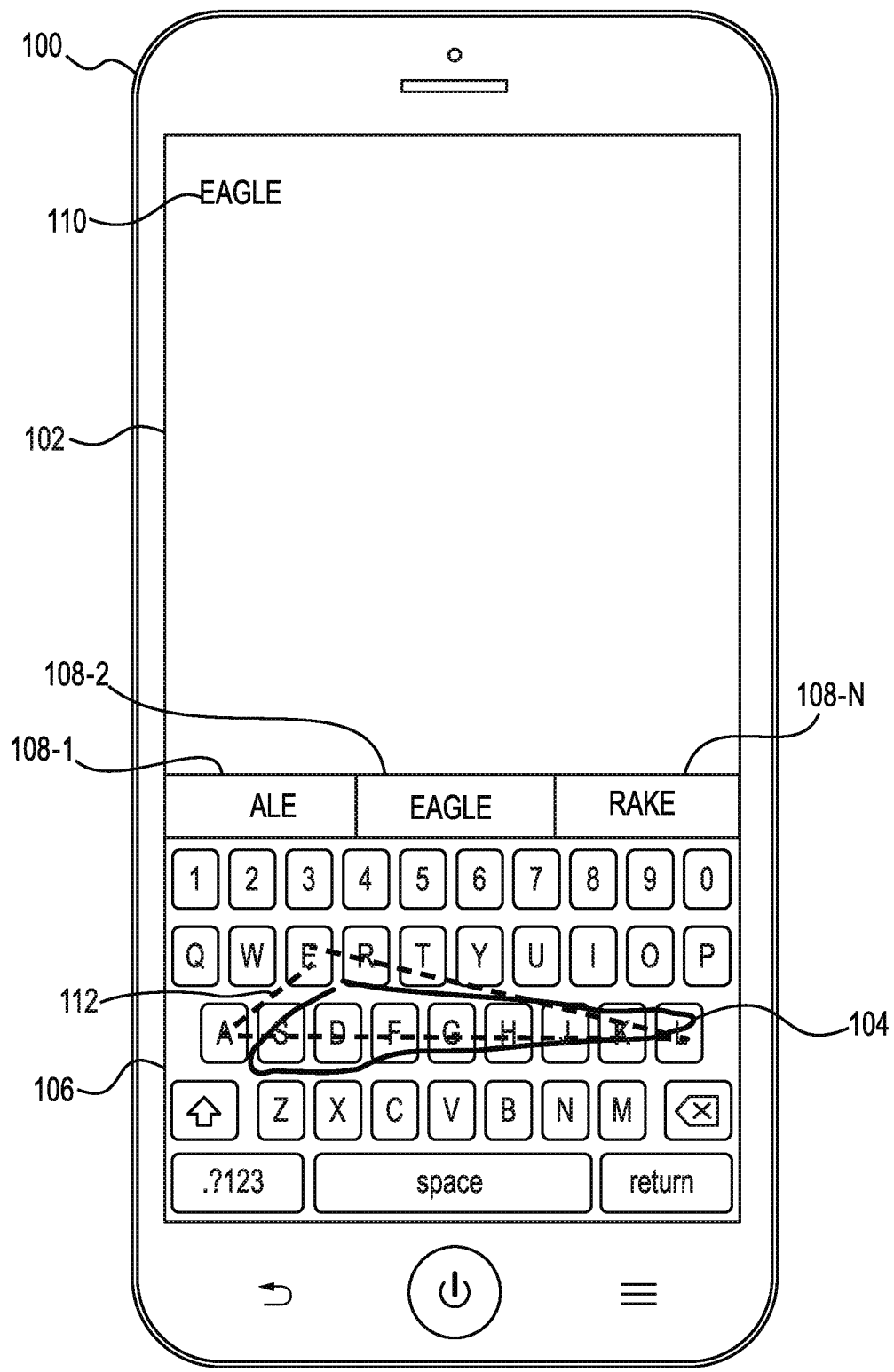
FIG. 1 illustrates an example of a computing device to perform cursor adjustments consistent with the disclosure.

A user may utilize a cursor positioning device to interact with a computing device. As used herein, a cursor positioning device generally refers to a sensing device or sensing surface connected to, in communication with, and/or integrated with a computing device. A cursor positioning device may include a peripheral device and/or an integrated device. For example, a cursor positioning device may include a mouse, a track pad, a handset, a joystick, a light pen, a touchscreen, a trackball, etc.

A cursor positioning device may detect and accept as input user touch and user movement. The cursor positioning device may convert the input into a cursor positioning signal output. As used herein, a cursor positioning signal may include an electronic signal generated by a cursor positioning device to communicate the user touch, user movement, and/or the magnitude of said user touch and user movement.

A computing device may receive the cursor positioning signal as an input. The computing device may respond to the cursor positioning signal. A response to a cursor positioning signal by a computing device may include moving a cursor along a path across a graphical user interface, making a selection of a portion of a graphical user interface, and/or displaying the movement or selection on a display. The response of the computing device to the cursor positioning signal may be based on the cursor positioning signal. That is, a position of a graphical user interface selected, a distance traversed across a graphical user interface, and/or a path of that traversal may be determined based on the cursor position signal.

Different users may have different physical characteristics and different abilities that may influence their interactions with a cursor positioning device. For example, a user may have a unique digit length, unique limb length, unique mobility limitations, unique cognitive abilities, unique reflexes, unique hand-to-eye coordination, a unique range of motion, and/or other unique abilities. The characteristics of a user may influence an interaction with a cursor positioning device by defining the ability of the user to perform manipulations of the cursor positioning device. The characteristics of a user may influence an interaction with a cursor positioning device by defining the response that a user expects to occur (e.g., a portion of a graphical user interface that the user expects to be traversed, a path of that traversal, a portion of a graphical user interface that the user expects to be selected, etc.) in response to their manipulation of a cursor positioning device. For example, a user with a first range of motion may expect a cursor to traverse a virtual distance along a particular path in a graphical user interface in response to the user's manipulation of a cursor positioning device by moving their finger a first physical distance across a touchscreen in the natural world. A second user may have a second, more limited, range of motion and may expect a cursor to traverse the same virtual distance along the same particular path in response to the user's manipulation of the same cursor positioning device by moving their finger a second, more limited, physical distance across the same touchscreen.

Additionally, different users may have different preferences for a response by a computing device to a cursor positioning signal. A user may prefer a unique relationship between an amount of user input to a cursor positioning device and an amount of a response to the cursor positioning signal. For example, a first user may prefer that a cursor traverses a first virtual distance in response to the user's manipulation of a cursor positioning device by a physical distance in the natural world. Simultaneously, a second user may prefer that the cursor traverses a second, greater, virtual distance in response to the user's manipulation of the cursor positioning device by the same physical distance. In some examples, user preferences for the response may vary by the user's current body position, an operation the user is engaged in, and/or an application the user is utilizing.

Regardless of whether a user's expectation for a response of a computing device to a cursor positioning signal is based on user characteristics or preference, a user's satisfaction with and efficiency of an interaction with a computing device may be heavily influenced by the ability of the computing device to meet these expectations. A user's ability to seamlessly interface with a graphical user interface may ultimately determine an adoption rate associated with a computing device and/or an operating system of a computing device.

Further, when a user's intended cursor position and/or cursor path is different from a cursor position or cursor path manifested by the computing device in response to the cursor positioning signal, erroneous operations may occur on the computing device. For example, the cursor positioning signal may correspond to a user's attempt to input text into an application on the graphical user interface (GUI). As such, the user's intended cursor position and/or cursor path may correspond to intended text input. Differences between the user's intended cursor position and/or cursor path and the cursor position or cursor path manifested by the computing device may generate erroneous text input resulting in, for example, a spelling error. Beyond the frustration this causes to a user, such an error involves corrective action to be taken by the error or the computing device.

Attempts to alleviate such errors involve treating the "symptom" of misspelled words without appreciating or addressing the "disease" of discrepancies between the user's intended cursor position and/or cursor path and the cursor position or cursor path manifested by the computing device. That is, attempts have included utilizing a spell checker and/or an auto-corrector that analyzes the text inputs and identifies spelling errors and suggests alternatives, as with the spell checker, and/or automatically picks the most likely alternative to a misspelled or unrecognized word. However, since the discrepancies between the user's intended cursor position and/or cursor path and the cursor position or cursor path manifested by the computing device are ultimately left unaddressed in these attempts, the same and/or similar errors can be repeated over and over. As such, the consumption of additional computing resources to operate the spell checker and/or auto-corrector will be repeated stealing computing capacity, power, and battery life from the computing device. Additionally, a user may be repeatedly annoyed by the presentation and subsequent compulsory selection of alternatives to misspelled or unidentified words. Moreover, such attempts may frequently result in embarrassing and frustrating unintended text being introduced into communications through auto-correction (e.g., a misspelled text input being auto-corrected to an inappropriate word in a text message sent to another).

In contrast, examples of the present disclosure may include computing devices, methods, and machine-readable media to perform cursor adjustments based on error corrections. The computing devices may, for example, provide a first output associated with a first cursor path received from a cursor positioning device. The computing devices may determine a modified output of the first cursor path that is different from the first output. The computing devices may then determine a second cursor path based on the modified output and determine an adjustment based on a difference between the first cursor path and the second cursor path. The computing devices may apply the adjustment to a third cursor path.

FIG. 1 illustrates an example of a computing device 100 to perform cursor adjustments consistent with the disclosure. The computing device 100 may be a type of device such as a laptop computer, a desktop computer, a tablet computer, a mobile computing device, a smartphone, etc. As used herein, a computing device 100 may include processing resources and/or machine readable instructions executable by the processing resources. The machine readable instructions may be stored on a memory resource of the computing device 100 such as non-transitory computer readable medium. The machine readable instructions may include instructions for an operating system that manages computing device 100 resources, applications, and services. The machine readable instructions may include instructions to generate and display a graphical user interface (GUI) on a display 102 of the computing device 100.

The computing device 100 may include and/or be in communication with a cursor positioning device. That is, the cursor positioning device may include a device that is peripheral to or integrated with the computing device. For example, the cursor positioning device may include a mouse, a track pad, a handset, a joystick, a light pen, a touchscreen, a trackball, etc. In an example, the cursor positioning device may include a touchscreen overlaid on the display 102.

As described above, the cursor positioning device may detect and accept as input user touch and user movement. The cursor positioning device may convert the physical input into a cursor positioning signal output. The cursor positioning signal may be utilized by the computing device 100 as the basis for movement across and selection of portions of the GUI.

The computing device 100 may receive the cursor positioning signal from the cursor positioning device. The computing device 100 may determine from the cursor positioning signal an action or a movement to effectuate and display in the GUI appearing on the display 102. A distance that a computing device 100 will move and display the movement of a cursor may be determined based on, for example, an amount of touch or movement input into the cursor positioning device. For example, if a user moved their finger across a track pad four inches then the computing device 100 response may include twenty inches of movement of a cursor across a GUI displayed on display 102. In contrast, if a user only moved their finger across a track pad two inches then the computing device 100 response may include ten inches of movement of a cursor across a GUI displayed on display 102.

The computing device 100 may determine from the cursor positioning signal a cursor path 104 associated with the cursor positioning signal. As used herein, a cursor path 104 may include the portion of a GUI that is traversed by the cursor during an execution of the cursor positioning signal by the computing device. For example, the cursor path 104 may include the location and/or X-Y coordinates of the portion of a GUI that is under the portion of the touchscreen manipulated by the user.

The computing device 100 may include a virtual keyboard 106 displayed on a portion of the display 102. As used herein, a virtual keyboard 106 may include a displayed virtual input method. For example, a virtual keyboard 106 may include a virtual manifestation of selectable characters displayed on the display 102 as a result of the execution of instructions by a processing resource of the computing device 100. The selectable characters of the virtual keyboard 106 may include arranged as an alphanumeric virtual keyboard with a QWERTY layout.

A cursor path 104 may traverse the virtual keyboard 106. For example, a user may slide his finger and/or stylus creating an input path across a touchscreen over the virtual keyboard displayed on the display 102 from a first letter of a word to a last letter of a word. The touchscreen may translate the physical touch of the user along the input path to a digital cursor positioning signal communicating the cursor path 104. The cursor path 104 may include the portions of the virtual keyboard traversed by the user's finger in generating the cursor positioning signal and/or traversed by the cursor upon execution of the cursor positioning signal by the computing device 100. A cursor path 104 may begin where a user starts manipulating the cursor positioning device and end when the user terminates their manipulation such as by lifting their finger or stylus off the cursor positioning device. Each cursor path 104 may correspond to a different word.

Selection of distinct selectable characters of the virtual keyboard 106 may be inherent to the cursor path 104. The cursor path may represent a series of virtual keystrokes including selections of selectable characters that fall under the cursor path 104. That is, the cursor path 104 may include a first input of a plurality of distinct selectable characters that fall under the cursor path 104. The computing device 100 may determine the selectable characters situated under the cursor path 104. For example, the computing device 100 may receive the cursor positioning signal including the cursor path 104 from the touchscreen. The computing device 100 may determine the selectable characters lying under the cursor path 104. For example, the cursor path 104 is illustrated starting not aligned with any selectable character but then traversing the "S", "F", "G", "H", "J", "K", "L", "K", "J", and then "R" selectable characters. As such, the cursor path 104 received from the cursor positioning device may correspond to an input of the text SFGHJKLKJ followed by a space.

The computing device 100 may utilize a predictive text functionality to predict an intended word output associated with the cursor path 104. The predictive text functionality may analyze the first input of the text "SFGHJKLKJ" to predict the intended word output. The predictive text functionality may predict an intended dictionary word format output associated with the cursor path 104 by analyzing the non-dictionary formatted word input, "SFGHJKLKJ", utilizing a language model, a word search engine, a corresponding word database, a priority of words within the database, user priority habits in the database, word connection relationships in the data base, user priority on word connection relationships in the database, and/or context in the form of the last implemented function (e.g., last word typed in a string of words).

For example, utilizing the predictive text functionality discussed above, the computing device 100 may determine a modified output 110. The modified output 110 may be an output, such as a word, that is predicted to correspond to the cursor path 104. The modified output 110 may be an output that is different from the input resulting from a verbatim execution of the input cursor path 104. For example, the modified output 110 may include a word, such as a dictionary word, that has a different format (e.g., spelling, structure, punctuation, vowel elisions, etc.) from the input resulting from a verbatim execution of the input cursor path 104. In the illustrated example included in FIG. 1, the user may have intended to input a dictionary word such as "EAGLE" by tracing the cursor path 104 on a touchscreen over the SFGHJKLKJ selectable characters. The computing device 100 may modify the non-dictionary word format "SFGHJKLKJ" input resulting from a verbatim execution of the cursor path 104 to the modified output 110 having a dictionary word format of "EAGLE." The modification may occur without displaying the non-dictionary word format "SFGHJKLKJ" input.

Additionally, the computing device 100 may determine a plurality of alternative modified outputs 108-1, 108-2, . . . 108-N utilizing the predictive text functionality discussed above. The alternative modified outputs 108-1, 108-2, . . . 108-N may include a plurality of dictionary words that are predicted to correspond to the cursor path 104.

The computing device 100 may generate the modified output 110 without additional input, beyond the cursor path 104, from a user. The modified output 110 may be selected from the plurality of alternative modified outputs 108-1, 108-2, . . . 108-N. The modified output 110 may be selected from the plurality of alternative modified outputs 108-1, 108-2, . . . 108-N by the predictive text functionality described above. The computing device 100 may generate the modified output 110 in response to the selection.

Alternatively, the computing device 100 may generate the modified output 110 in response to a selection of a modified output 110. The selection of the modified output 110 may be a selection of a modified output 110 from a user. For example, the computing device 100 may present the plurality of alternative modified outputs 108-1, 108-2, . . . 108-N to a user for selection. The user's selection among the plurality of alternative modified outputs 108-1, 108-2, . . . 108-N may be utilized by the computing device to generate the modified output 110. For example, the computing device may output "EAGLE" responsive to a user selecting "EAGLE" from the plurality of alternative modified outputs 108-1, 108-2, . . . 108-N.

The computing device 100 may determine a second cursor path 112 based on the modified output 110. Determining the second cursor path 112 may include determining modified virtual keystroke of the virtual keyboard 106 to generate the modified output 110. For example, determining a second cursor path 112 may include determining a virtual cursor path that, when executed by the computing device 100, would produce the modified output 110. Determining the second cursor path 112 may include determining a preferred second cursor path. A preferred second cursor path may include a second cursor path 112 where the selectable characters corresponding to every letter in the modified output 110 are traversed by the second cursor path 112 and selectable characters corresponding to superfluous or incorrect letters are avoided. The preferred second cursor path may include a second cursor path 112 that, when executed, reduces the amount of alternative modified outputs 108-1, 108-2, . . . 108-N by reducing the amount of incorrect or missed selected characters associated with the cursor path 104. In some examples, the second cursor path 112 may include more selectable characters than the cursor path 104, but the selectable characters may reduce the amount of alternative modified outputs 108-1, 108-2, . . . 108-N or make the identification of the modified output 110 more likely than an execution of the cursor path 104. In the example provided in FIG. 1 where the modified output 110 is the word "EAGLE", the second cursor path 112 may be determined to be a virtual cursor path starting on the selectable character "E" and traversing the "A", "S", "D", "F", "G", "H", "J", "K", "L", "K", "J", and then "E" selectable characters since such a cursor path includes section of the "E", "A", "G", "L", and "E" letters present in the modified output 110. Although illustrated as a broken line for clarity, the second cursor path 112 may not be a precise path, or a precise location and/or X-Y coordinates of the portion of a GUI that is under the portion of the touchscreen manipulated by the user. Rather, the second cursor path 112 may be a range of locations and/or a range of X-Y coordinates of the GUI corresponding to a preferred cursor path. Further, while illustrated as a visible broken line for clarity purposes, the second cursor path 112 may not be displayed on the display 102 or be otherwise visible to the user.

In addition to the location, X-Y coordinates, and/or selectable characters associated with the cursor path 104 and the second cursor path 112, the cursor path 104 and the second cursor path 112 may include information related to direction changes included in the cursor path 104 and the second cursor path 112. For example, the cursor path 104 may include information indicating that the direction of the path changed at a position corresponding to a location just under and between the "A" and "S" selectable characters and then changed direction again at a position corresponding to a location of the "L" selectable character. In contrast the second cursor path 112 may include information indicating that the direction of the path changed at a position corresponding to the location of the "A" selectable character and then changed direction again at a position corresponding to a location of the "L" selectable character.

A computing device 100 may determine that a modified output 110 has been determined and/or displayed on display 102. The computing device 100 may determine the second cursor path 112 response to the determination that the modified output 110 has been determined and/or displayed on display 102.

The computing device 100 may compare the cursor path 104 and the second cursor path 112. For example, the computing device 100 may compare the location, the X-Y coordinates, and/or the position of direction changes associated with cursor path 104 to the range of locations, the X-Y coordinates, and/or the position of direction changes associated with the determined second cursor path 112. Comparing the paths may include determining a difference between the cursor path 104 and the second cursor path 112. Determining a difference may include determining where the cursor path 104 diverges from and/or falls outside the range of locations, the range of X-Y coordinates, and/or the position of direction changes associated with the determined second cursor path 112. Determining a difference may include determining a type of difference between the paths. Determining a type of difference between the paths may include determining whether misalignments or distance differences between the paths indicate whether the cursor path 104 fell short of reaching a portion of the second cursor path 112 and/or the cursor path 104 exceeded a portion of the second cursor path 112. Such a determination may be based on a determined handedness of a user. For example, determining the difference between the paths may include determining that cursor path 104 diverged from the second cursor path 112 falling short of reaching the "E" selectable character as a starting point, falling short of reaching the "A" selectable character after the "E" character, and then falling short of reaching the "E" selectable character to end the input for a right-handed user.

The computing device 100 may determine an adjustment based on the difference between the cursor path 104 and the second cursor path 112. For example, the computing device 100 may determine that a user has a characteristic (e.g., digit length, range of motion limitation, proclivity to overestimate the location of their input, etc.) that prevents the user from being to properly reach the portions of the touchscreen cursor positioning device that corresponds to where the intended selectable characters are displayed. As such, the computing device 100 may determine an adjustment to accommodate the characteristic so that the users input and the computing device's 100 output match the user's intentions thereby improving the user experience.

That is, the computing device 100 may determine an adjustment that, if applied to the cursor positioning signal or the response thereto, would cause a portion of the cursor path 104 to converge to a portion of the second cursor path 112. For example, the computing device 100 may adjust a setting related to how the computing device 100 responds to user input. In an example, the computing device 100 may attribute more movement across the GUI and/or an adjusted relationship between the location of the input on the user positioning device and the location on underlying displayed GUI corresponding to the location of the input. That is, a computing device 100 may increase its sensitivity to a user's input and/or shift the interpreted location of the user's input such that application of the adjustment would have caused the cursor path 104 to coincide with the second cursor path 112.

The computing device 100 may determine an adjustment applicable to only a portion of the cursor positioning device. For example, the computing device 100 may determine an adjustment that modifies a sensitivity of a response and/or shifts an interpreted location of input on a portion of the touchscreen cursor positioning device over a portion of the display 102 displaying a portion of the virtual keyboard 106 that has been determined to be associated with a difference between the cursor path 104 and the second cursor path 112 (e.g., the portion of the displayed virtual keyboard 106 including selectable characters that the cursor path 104 indicates that the user has fallen short of or overshot while entering their input).

Additionally, the computing device 100 may determine an adjustment that changes the display 102 and/or the location of portions of the GUI on the display 102. For example, the computing device may shift the displayed position of the selectable characters on the virtual keyboard so that the cursor path 104 would coincide with a second cursor path 112 if the second cursor path 112 was determined on the basis of the modified displayed position of the selectable characters.

In some examples, the computing device 100 may determine an adjustment that is applicable in a specific application or type of application running on the computing device. For example, the computing device 100 may determine an adjustment that will be applied when a user is entering cursor path inputs using a virtual keyboard for a text messaging application and/or a web browsing application running on the computing device. If the specific application or type of application is not running on the computing device 100, the determined adjustment may not be applicable.

The computing device 100 may apply the determined adjustment to a third cursor path. As used herein, a third cursor path may include a cursor path associated with a second user input that is distinct from the first user input associated with the cursor path 104. That is, the third cursor path is associated with a different and/or subsequent cursor positioning operation by a user. For example, the third cursor path may be a cursor path that is associated with a next word input by a user. In an example, after a user has slid his finger and/or stylus creating an input path across a touchscreen over the virtual keyboard displayed on the display 102 from a first letter of a word to a last letter of a word generating the modified output 110, the user may lift his finger or stylus and then repeat the process for a second word generating the third cursor path.

Applying the adjustment to the third cursor path may include adjusting the response of the computing device 100 to the third cursor path as described above. For example, applying the adjustment to the third cursor may include adjusting the response of the computing device 100 to the third cursor path in a manner and magnitude that if applied to the cursor path 104 would have resulted in the cursor path 104 coinciding with the second cursor path 112.

In the example illustrated in FIG. 1, the determined adjustment may have included attributing increased horizontal and vertical movement to portions of a cursor path coinciding with the left most one third of the virtual keyboard 106. Such an adjustment, if applied to the cursor path 104 may have resulted in achieving the second cursor path 112 described above. The computing device 100 may apply the determined adjustment to a third cursor path by attributing increased horizontal and vertical movement to portions of the third cursor path coinciding with the left most one third of the virtual keyboard 106. Therefore, while the adjustment may be determined with respect to a cursor path 104 and a second cursor path 112, it may be applied to a third cursor path input subsequent to and different from the cursor path 104.

The user input and cursor paths described above are generally described in relation to continuous gesture user input such as trace path cursor positioning inputs communicated to the computing device 100 using a Swype® keyboard. However, the examples are not limited to continuous gesture user input. For example, rather than a continuous gesture user input a user may utilize a hunt-and-peck form of user manipulation of the cursor positioning device and the underlying virtual keyboard 106. A hunt-and-peck manipulation may involve the user entering inputs by individually and singularly selecting distinction portions of the cursor positioning device and/or the underlying selectable characters of the virtual keyboard 106 appearing on the display 102. For example, a user may attempt to individually press the portion of the cursor positioning device corresponding to the "E" selectable character, the "A" selectable character, the "G" selectable character, the "L" selectable character, the "E" selectable character again, and the spacebar selectable character in order to input the word "EAGLE" to the computing device 100.

In such examples, the cursor path 104 may correspond to the location and/or X-Y coordinates of the portion of a GUI that is under the portion of the touchscreen manipulated by the user in each of the individual presses of the touchscreen making up the input of the word. In such examples, the modified output 110 may correspond to a corrected format (e.g., spelling, structure, punctuation, vowel elisions, etc.) of the input word. The modified output 110 may be determined utilizing the predictive text functionality described above. The second cursor path 112 of the examples may include the location and/or X-Y coordinates of the portion of a GUI that is under the portion of the touchscreen corresponding to each of the selectable characters making up the modified output 110. In such examples, the third cursor path may also be based on a hunt-and-peck manipulation of a cursor positioning device.

Figure 2:
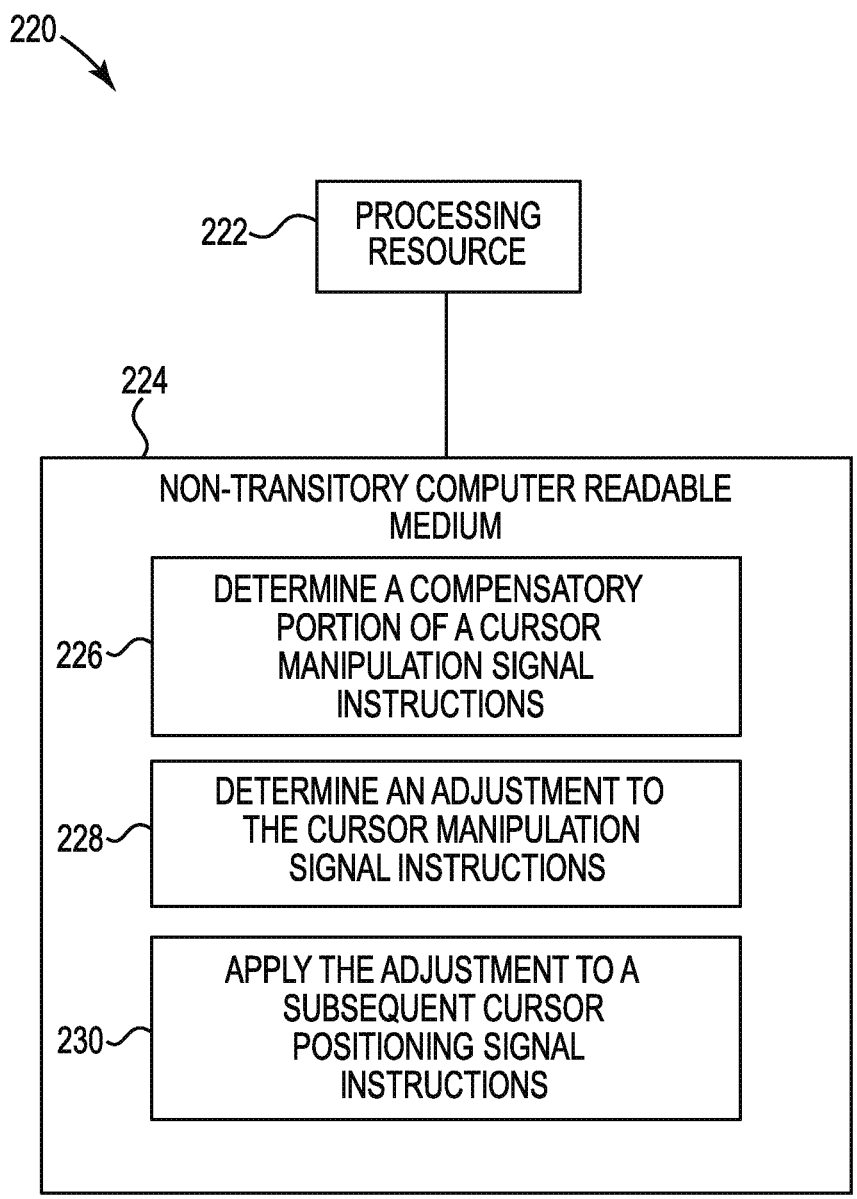
FIG. 2 illustrates a diagram of an example of a processing resource and a non-transitory computer readable medium to perform cursor adjustments consistent with the disclosure.

FIG. 2 illustrates a diagram 220 of an example of a processing resource 222 and a non-transitory computer readable medium 224 to perform cursor adjustments consistent with the disclosure. In some examples, the processing resource 222 may process and/or control data received from a cursor positioning device such as a mouse, a track pad, a handset, a joystick, a light pen, a touchscreen, a trackball, etc. A memory resource, such as the non-transitory computer readable medium 224, may be used to store instructions (e.g., 224, 228, 230) executed by the processing resource 222 to perform the operations as described herein. A processing resource 222 may execute the instructions stored on the non-transitory computer readable medium 224. The non-transitory computer readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 222 to determine a compensatory portion of a cursor positioning signal. A cursor positioning signal may be received from a cursor positioning device. The cursor positioning signal may include multiple portions. Distinct portions of the cursor positioning signal may correspond to distinct movements and actions of a cursor relative to a GUI once executed. In some examples, the cursor positioning signal may include a compensatory portion. As used herein, a compensatory portion of a cursor positioning signal may include portions of a cursor positioning signal associated with movements and actions of a cursor relative to a GUI that once executed adjust a displayed cursor position resulting from an execution of a portion of the cursor positioning signal to an intended cursor position. The compensatory portion of the cursor positioning signal may be a second portion of the cursor positioning signal generated after the execution of a first portion of the cursor positioning signal. For example, a cursor positioning signal may include a first portion associated with scrolling down a webpage that is generated by actuating a scroll wheel upward, moving a mouse upward, or sliding a finger upward across a touchscreen. Execution of this first portion of the cursor positioning signal may result in a cursor traversing a webpage downward and coming to rest at a displayed cursor position on the GUI. However, the displayed cursor position may not correspond to an intended cursor destination. That is, the user may have intended to scroll further down the webpage or, alternatively, not as far down the web page as the displayed cursor position. The user may compensate for the difference between their expectation and the reality of the displayed cursor position by inputting a second compensatory portion of the cursor positioning signal. For example, the user may scroll back to the intended cursor position if the display cursor position exceeded the intended cursor destination or the user may scroll further if the displayed cursor position fell short of the intended cursor position. The intended cursor position may be determined as the position that the cursor comes to rest for more than a threshold amount of time following the execution of the compensatory portion of the cursor positioning signal.

Determining the compensatory portion of a cursor positioning signal may include identifying a portion of the cursor positioning signal corresponding to a continuing a movement of a cursor further in a same direction associated with the cursor movement imparted from the execution of the first portion of the cursor positioning signal. The continuing movement of the cursor further in the same direction may be determined to be a compensatory portion of a cursor positioning signal when it occurs after the execution of the first portion of the cursor positioning signal, but within a threshold time to the execution of the first portion of the cursor positioning signal.

Additionally, determining the compensatory portion of a cursor positioning signal may include identifying a portion of the cursor positioning signal corresponding to a continuing a movement that retraces back over the cursor movement imparted from the execution of the first portion of the cursor positioning signal. The continuing retracing movement may be determined to be a compensatory portion of a cursor positioning signal when it occurs after the execution of the first portion of the cursor positioning signal, but within a threshold time to the execution of the first portion of the cursor positioning signal.

Further, determining the compensatory portion of a cursor positioning signal may include identifying a portion of the cursor positioning signal corresponding to a follow-up selection of a portion of the GUI (e.g., via a "click" of the user positioning device) following an initial selection of a portion of the GUI included in the first portion of the cursor positioning signal that resulted in a null input, a void input, and/or no output at the computing device. In some examples, the follow-up selection may include a selection of a modified output corresponding to the initial selection (e.g., the selection of an intended output corresponding to the initial selection. The follow-up selection may be determined to be a compensatory portion of a cursor positioning signal when it occurs after the execution of the initial selection in first portion of the cursor positioning signal, but within a threshold time to the execution of the initial selection first portion of the cursor positioning signal.

Further still, determining the compensatory portion of a cursor positioning signal may include identifying a portion of the cursor positioning signal corresponding to a selection of a portion of a GUI immediately preceding a deletion or an undo operation imparted from the execution of the first portion of the cursor positioning signal. The selection may be determined to be a compensatory portion of a cursor positioning signal when it occurs after the execution of the deletion or an undo operation of first portion of the cursor positioning signal, but within a threshold time to the execution of the deletion or an undo operation of first portion of the cursor positioning signal.

The example medium 224 may store instructions 228 executable by the processing resource 222 to determine an adjustment to the cursor positioning signal. The adjustment to the cursor positioning signal may be determined based on the compensatory portion of the cursor positioning signal. Determining the adjustment may include determining a distance of cursor travel (e.g., in relation to a GUI, in relation to a display, in relation to a display of the GUI, etc.) that may be attributed to the compensatory portion of the cursor positioning signal. For example, the distance of cursor travel resulting from the execution of the compensatory portion of the cursor positioning signal may be measured be measuring a distance between a cursor position resulting from the execution of the non-compensatory portion of the cursor positioning signal and a cursor position resulting from the execution of the compensatory portion of the cursor positioning signal.

Determining the adjustment may include determining an adjustment to a response by the computing device to the non-compensatory portion of the cursor positioning signal. For example, the adjustment may include an adjustment that, if it had been applied to the non-compensatory portion of the cursor positioning signal, would have resulted in the arrival of the cursor at the cursor position resulting from execution of the compensatory portion without input of the compensatory portion of the cursor positioning signal. The adjustment may be determined based on the above described determined distance. In an example, determining the adjustment may include determining an adjusted sensitivity setting of the computing device to a cursor positioning signal that would result in increasing or decreasing the amount of cursor travel across a GUI imparted by execution of the non-compensatory portion of the cursor positioning signal such that the distance traversed by the cursor through such an execution is adjusted by the above described determined difference. That is, determining the adjustment may include determining an adjustment that obviates the compensatory portion of the cursor positioning signal based on the distance of cursor travel associated with the compensatory portion of the cursor positioning signal.

The example medium 224 may store instructions 230 executable by the processing resource 222 to apply the adjustment to a subsequent cursor positioning signal. A subsequent cursor positioning signal may include a cursor positioning signal that is received subsequent to the execution of the non-compensatory and compensatory portion of the cursor positioning signal. The subsequent cursor positioning signal may include a cursor positioning signal that is received subsequent to the determination of the adjustment to the cursor positioning signal. The subsequent cursor positioning signal may include a cursor positioning operation by a user that is different from and/or input subsequent to the cursor positioning signal used to determine the adjustment.

Applying the adjustment may include adjusting a response of the computing device to a subsequent cursor positioning signal. For example, applying the adjustment may include adjusting a sensitivity setting of the cursor positioning device and/or a response of the computing device to a cursor positioning device. In an example, if the determined adjustment is an increased distance of cursor travel, the computing device may increase the sensitivity setting such that an amount of cursor travel across a GUI imparted by an execution of the subsequent cursor positioning signal is increased by a same magnitude as the determined adjustment. In another example, if the determined adjustment is a decreased distance of cursor travel, the computing device may decrease the sensitivity setting such that an amount of cursor travel across a GUI imparted by an execution of the subsequent cursor positioning signal is decreased by a same magnitude as the determined adjustment.

In this manner, a response of a computing device to the subsequent cursor positioning signals input by a user may be adjusted so that a user does not have to input compensatory cursor positioning signals. That is, a user's expectation of a cursor position on a GUI resulting from an execution of a cursor positioning signal will match the reality of where the cursor ends up positioned on the display.

Applying the adjustment to a subsequent cursor positioning signal may include applying the adjustment in an application-specific manner. For example, the computing device may recognize a specific application and/or application type that is being utilized by a user. Recognizing a specific application may include determining the identity and/or characteristic of an application that is in focus when a cursor positioning signal is received. As used herein, an application is in focus when it is running and it is the component of the GUI that is selected to receive input. For example, if a slide presenting application and a word processing application are running on the GUI and a user begins typing text on a keyboard, then the application interface where the text appears is the application that is in focus. The application-specific setting adjustment specific to the application that is being utilized by the user may be applied responsive to a recognition of the application. The specificity of the application-specific adjustment may be determined based on the specific application and/or application type that is in focus during the receipt and execution of the first cursor positioning signal that the adjustment was determined from.

Figure 3:
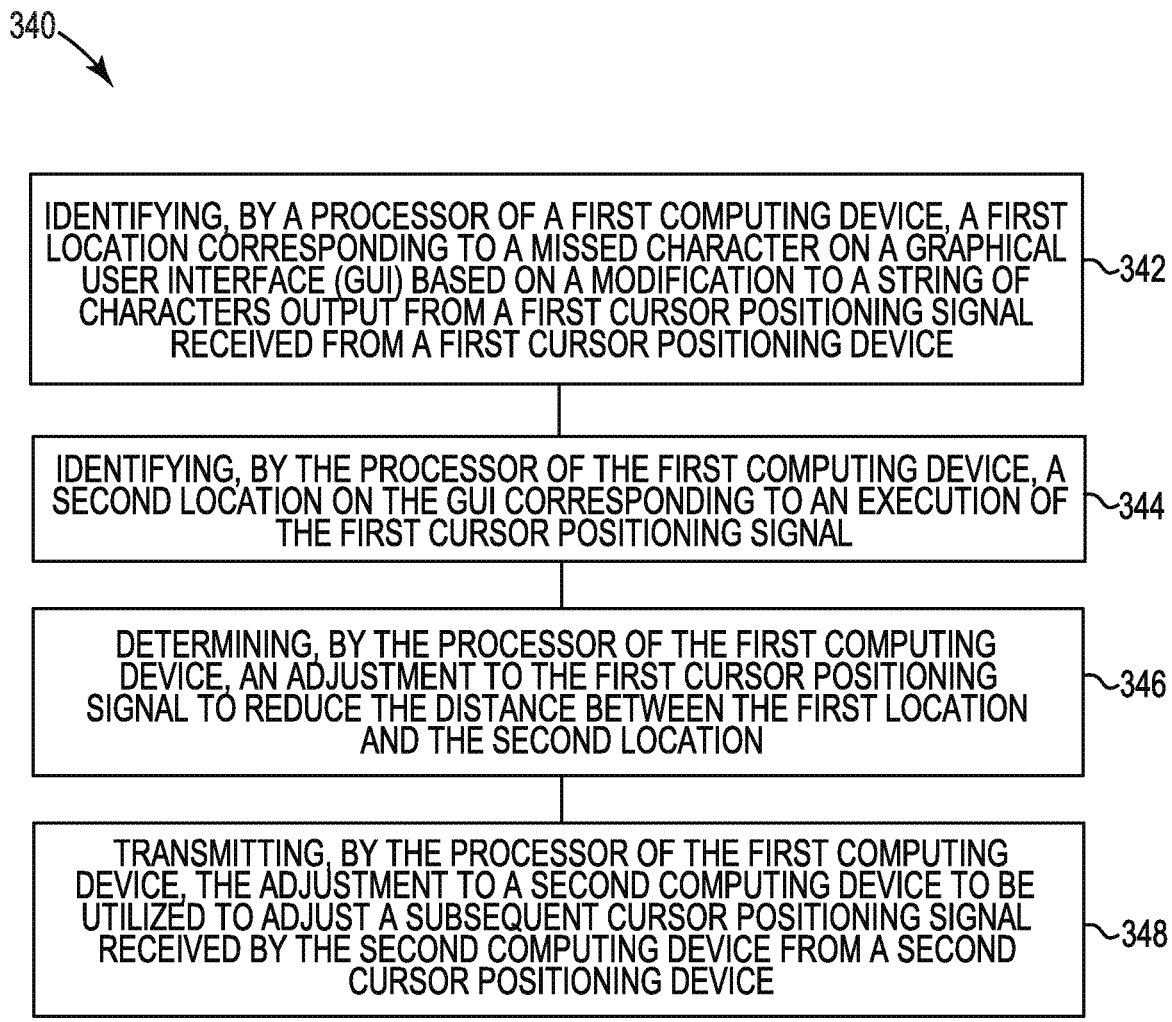
FIG. 3 illustrates a flow diagram of an example of a method to perform cursor adjustments consistent with the disclosure.

FIG. 3 illustrates a flow diagram of an example of a method 340 to perform cursor adjustments consistent with the disclosure. At 342, the method 340 may include identifying, by a processor of a first computing device, a first location corresponding to a missed character on a GUI. The location may be the relative location and/or the X-Y coordinates of the missed character on the GUI. The missed character may be a selectable character included on a virtual keyboard on the GUI.

The missed character may be a character that was not selected by a cursor in an execution of a first cursor positioning signal received from a first cursor positioning device. The missed character may be identified based on a modified output resulting from the execution of the first cursor positioning signal. For example, the missed character may be identified as a character that was not selected in a string of characters identified in an execution of the first cursor positioning signal but is present in a modified string of characters making up the modified output. A predictive text functionality may be utilized to generate the modified string of characters.

At 344, the method 340 may include identifying, by the processor of the first computing device, a second location on the GUI corresponding to the execution of the first cursor positioning signal. The second location of the GUI may correspond to a relative location and/or the X-Y coordinates of where the cursor was displayed during the execution of the first cursor positioning signal. Specifically, the second location of the GUI may correspond to the location of the miss. That is, the second location of the GUI may correspond to a position of where the cursor was displayed during the execution of the portion of the first cursor position signal corresponding to a time or order of input where the missed character failed to be input by the user. Thus, the second location may correspond to where the user's input was instantiated on the GUI when it should have been instantiated over and/or selecting the missed character.

At 346, the method 340 may include determining, by the processor of the first computing device, an adjustment to the first cursor positioning signal. Determining the adjustment may include determining the distance between the first location and the second location. Determining the distance may include determining whether the distance corresponds to a distance that a second location is further from the first location relative to a starting point of the cursor positioning signal or to a distance that a second location is short of the first location relative to the starting point of the cursor positioning signal. Determining the adjustment may include determining an adjustment to the first cursor positioning signal and/or a response by the first computing device thereto that would reduce the distance between the first and second location if applied to the first cursor positioning signal and/or the response thereto. Determining the adjustment may include determining a corresponding adjustment to a sensitivity of the first cursor positioning signal and/or a response by the first computing device thereto that would reduce the distance between the first location and the second location if applied to the first cursor positioning signal and/or the response thereto.

At 348, the method 340 may include transmitting, by the processor of the first computing device, the adjustment to a second computing device. The adjustment may be transmitted to the second computing device to be utilized to adjust a subsequent cursor positioning signal received by the second computing device from a second cursor positioning device. The subsequent cursor positioning signal may include a cursor positioning signal that is received and or executed by a second computing device subsequent to receipt of the first cursor positioning signal by the first computing device, execution of the first cursor positioning signal by the first computing device, determination of the adjustment by the first computing device, and/or transmission of the adjustment to the second computing device.

The adjustment may also be logged, by the processor of the first computing device, to a third computing device. The adjustment may be logged to the third computing device in order to build an adjustment profile. The adjustment profile may be compiled and/or stored on the third computing device. The adjustment profile may be tied to a user profile or user logon. The adjustment profile may be accessible by a plurality of computing devices. In this manner, a user's adjustments may be computing device agnostic and travel with the user obviating recursive calibration procedures across computing devices. For example, the adjustment profile may be exported to or imported by a computing device and the settings of the computing device may be altered to accord with the adjustment. Therefore, regardless of the device a user chooses to utilize, their updated and preferred settings with regard to sensitivity of a response to a cursor positioning signal may be imported without going through a calibration period. The adjustment profile may also include information to determine appropriate settings for a specific computing device based on the adjustment determined for a different computing device and/or a different model, brand, or type of cursor positioning signal. For example, the adjustment profile may be utilized to determine that an increase in sensitivity by X for a ball mouse on computing device A translates to an increase in sensitivity by Y for an optical mouse on computing device B, where $X \neq Y$.

The adjustment profile tied to the user profile or user logon may also store information and settings specific to an application that was being utilized during the adjustment determination. For example, the adjustment profile may store information and settings specific to a word processing application that the first cursor positioning signal was directed to manipulate. In an example, the user profile adjustments may be application-specific and a specific adjustment to a response to a cursor positioning signal may be applied when the corresponding specific application is utilized. A user may have differing preferences or expectations of a device sensitivity setting across various applications. For instance, a user may expect one type of response to a cursor positioning signal when utilizing a word processing application and different type of response to a cursor positioning signal when working on small details while utilizing a design application. To provide appropriate setting adjustments the adjustment profile can track and include application-specific setting adjustments.

Additionally, a family of computing devices may be created. A family of computing devices may include a plurality of computing devices that may include the first computing device, the second computing device, and other computing devices. The family of computing devices may be a variety of different computing device types (e.g., desktop computer, laptop computer, tablet computer, mobile computing device, smartphone, etc.). A sensitivity of a response of each of the plurality of devices of the family to additional subsequent cursor positioning signals may be adjusted based on the adjustment determined by the processor of the first computing device. Therefore, a corresponding cursor positioning signal of each of the plurality of computing devices of the family to additional subsequent cursor positioning signals may be adjusted based on the adjustment determined by the processor of the first computing device. In this manner, all of a user's devices may achieve uniform adjustments without repeating a calibration process or manual setting adjustment on each device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. A "plurality of" is intended to refer to more than one of such things.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features.

What is claimed:

1. A computing device comprising:
  a cursor positioning device; and
  a processor to:
    determine an input associated with a first cursor path received from the cursor positioning device, wherein the first cursor path includes a first amount of cursor travel directed to a first set of characters across a virtual keyboard;
    determine a modified input of the first cursor path that is different from the input;
    determine a second cursor path based on the modified input, wherein the second cursor path includes a second amount of cursor travel that is different than the first amount of cursor travel;
    determine an adjustment based on a difference of the first amount of cursor travel and the second amount of cursor travel, wherein the adjustment is a change in a sensitivity of the cursor positioning device; and
    apply the adjustment to a third cursor path to alter a corresponding amount of cursor travel a particular distance based on the difference of the first cursor path and the second cursor path, wherein the third cursor path is directed to a second set of characters across the virtual keyboard that are different than the first set of characters.

2. The computing device of claim 1, wherein the computing device further includes a display, and wherein the cursor positioning device includes a touchscreen layered over the display.

3. The computing device of claim 1, wherein the first cursor path is based on a virtual keyboard manipulation of a virtual keyboard, and wherein the virtual keyboard manipulation includes an input of a word into the cursor positioning device.

4. The computing device of claim 3, wherein the modified input is a modified format of the word generated from a language model.

5. The computing device of claim 3, wherein the modified input is a modified format of the word generated from a selection of the modified format received by the computing device.

6. The computing device of claim 3, wherein the second cursor path includes a modified virtual keystroke of the virtual keyboard to generate a modified format of the word.

7. The computing device of claim 1, wherein to determine the adjustment includes to determine an adjusted amount of cursor movement attributed to a portion of the first cursor path to cause the portion of the first cursor path to converge to a corresponding portion of the second cursor path.

8. A non-transitory computer-readable medium containing instructions executable by a processing resource of a computing device to cause the processing resource to:
  determine a compensatory portion of a cursor positioning signal from a cursor positioning device for a first cursor path and a second cursor path, wherein the first cursor path includes a first amount of cursor travel directed to a first set of characters across a virtual keyboard and the second cursor path includes a second amount of cursor travel for the first set of characters, and wherein the compensatory portion is a difference between the first amount of cursor travel and the second amount of cursor travel;
  determine an adjustment to the cursor positioning signal based on the compensatory portion, wherein the adjustment is a change in a sensitivity of the cursor positioning device; and
  apply the adjustment to a third cursor path to alter a corresponding amount of cursor travel a particular distance based on the compensatory portion of the first cursor path and the second cursor path, wherein the third cursor path is directed to a second set of characters across the virtual keyboard that are different than the first set of characters.

9. The non-transitory computer-readable medium of claim 8, wherein to determine the adjustment to the cursor positioning signal includes determining a distance of cursor travel across a graphical user interface attributed to the compensatory portion of the cursor positioning signal.

10. The non-transitory computer-readable medium of claim 8, wherein to determine the adjustment to the cursor positioning signal includes determining a cursor position resulting from an execution of the compensatory portion of the cursor positioning signal.

11. The non-transitory computer-readable medium of claim 10, wherein to determine the adjustment to the cursor positioning signal includes determining an adjustment to a distance of cursor travel attributed to the cursor positioning signal, excluding the compensatory portion, that results in an arrival of a cursor at the cursor position.

12. A method comprising:
  identifying, by a processor of a first computing device, a first location corresponding to a missed character on a graphical user interface (GUI) based on a modification to a first string of characters output from a first cursor positioning signal received from a first cursor positioning device, wherein the first cursor positioning signal is directed to the first string of characters across a virtual keyboard of the GUI;
  identifying, by the processor of the first computing device, a second location on the GUI corresponding to an execution of the first cursor positioning signal;
  determining, by the processor of the first computing device, an adjustment to the first cursor positioning signal to reduce a distance between the first location and the second location, wherein the adjustment is a change in a sensitivity of the cursor positioning device such that an interpreted location of an input causes the first location to coincide with the second location;
  transmitting, by the processor of the first computing device, the adjustment to a second computing device to be utilized to adjust a subsequent cursor positioning signal received by the second computing device from a second cursor positioning device, wherein the adjustment alters the subsequent cursor positioning signal the distance when the second cursor positioning signal is directed to a second string of characters across the virtual keyboard of the GUI.

13. The method of claim 12, comprising logging the adjustment, by the processor of the first computing device, to a third computing device to be utilized to build an adjustment profile.

14. The method of claim 12, comprising creating a family of computing devices and adjusting a corresponding cursor positioning signal of each of a plurality of computing devices of the family to additional subsequent cursor positioning signals based on the adjustment determined by the processor of the first computing device.

* * * * *